US007582344B2

(12) United States Patent
Mori et al.

(10) Patent No.: US 7,582,344 B2
(45) Date of Patent: Sep. 1, 2009

(54) HEAT ROLLER

(75) Inventors: Mitsuhiro Mori, Kawasaki (JP); Koichi Sanpei, Kawasaki (JP); Masatoshi Kimura, Kawasaki (JP); Masao Konishi, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 112 days.

(21) Appl. No.: 11/812,760

(22) Filed: Jun. 21, 2007

(65) Prior Publication Data

US 2007/0254125 A1 Nov. 1, 2007

Related U.S. Application Data

(63) Continuation of application No. 10/739,031, filed on Dec. 19, 2003, now abandoned, which is a continuation of application No. PCT/JP02/05442, filed on Jun. 3, 2002.

(51) Int. Cl.
*B29D 22/00* (2006.01)
*B29D 23/00* (2006.01)
*B32B 1/08* (2006.01)

(52) U.S. Cl. .............. 428/36.91; 428/36.9; 430/124.31; 430/124.32; 399/333; 399/334; 219/216; 219/469; 432/60; 432/228; 492/46; 492/54

(58) Field of Classification Search ................ 428/34.1, 428/36.9, 36.91, 913; 29/895.211; 492/49.51, 492/46, 54; 219/216, 469, 470; 399/330–334; 432/60, 228; 430/124.31, 124.32
See application file for complete search history.

(56) References Cited

U.S. PATENT DOCUMENTS 3,961,158 A * 6/1976 Tabuchi et al. .............. 219/471
4,724,305 A * 2/1988 Iimura et al. ................ 219/469
5,616,263 A * 4/1997 Hyllberg ..................... 219/469
6,072,155 A 6/2000 Tomatsu
6,940,045 B2 9/2005 Sanpei et al.
7,026,578 B2 4/2006 Mori et al.
2003/0063931 A1 4/2003 Sanpei et al.
2004/0149709 A1 8/2004 Mori et al.

FOREIGN PATENT DOCUMENTS

| | | |
|---|---|---|
| JP | 60-186468 | 12/1985 |
| JP | 02-143278 | 6/1990 |
| JP | A-04-213480 | 8/1992 |
| JP | A-05-035137 | 2/1993 |
| JP | 06-318001 | 11/1994 |
| JP | A-08-036319 | 2/1996 |
| JP | 08-194401 | 7/1996 |
| JP | A-08-262900 | 10/1996 |
| JP | 08-328409 | 12/1996 |

(Continued)

*Primary Examiner*—Michael C Miggins
(74) *Attorney, Agent, or Firm*—Oliff & Berridge, PLC

(57) ABSTRACT

A heat roller having a cylindrical sheet-like heating element having a resistance member embedded in an insulating member. The sheet-like heating element is arranged between an inner tube and an outer tube. The outer tube is formed so as to be longer than the inner tube for reducing non-uniformity in heat of the heat roller. Further, a thermal expansion coefficient of a material of the outer tube is greater than that of a material of the inner tube. Moreover, a triple-tube heat roller is provided.

21 Claims, 16 Drawing Sheets

FOREIGN PATENT DOCUMENTS

| | | |
|---|---|---|
| JP | A-09-325540 | 12/1997 |
| JP | 11-024485 | 1/1999 |
| JP | 2001-134124 | 5/2001 |
| JP | A-2001-134124 | 5/2001 |
| JP | A-2001-249570 | 9/2001 |

* cited by examiner

HEAT ROLLER

CROSS-REFERENCE TO RELATED APPLICATIONS

This is a Continuation of application Ser. No. 10/739,031 filed Dec. 19, 2003, which is a continuation of PCT/JP02/05442, filed on Jun. 3, 2002. The entire disclosures of the prior applications are hereby incorporated by reference in their entirety.

TECHNICAL FIELD

The present invention relates to a heat roller. More particularly, the present invention relates to a heat roller suitable to be used, for example, for a fixing device used in an electrophotographic device.

BACKGROUND ART

An electrophotographic device (copying machine, facsimile device, printer and the like) has an image forming device and a fixing device for fixing an image formed and transferred onto a sheet by the image forming device. The fixing device includes a heat roller.

A heat roller is formed of a metallic ring member, rubber covering the metallic ring member and a halogen lamp arranged inside the metallic ring member. However, the halogen lamp is low in thermal efficiency, and moreover, the rubber covering the metallic ring member reduces the thermal efficiency. In addition, it takes several ten seconds to several minutes to reach a predetermined temperature, so that a preheating is required during a stand-by period.

Recently, there has been developed a directly-heated heat roller including a sheet-like heating element in which a resistance member is embedded in an insulating member. This heat roller has high thermal efficiency, since the resistance member generates heat when electric current flows through the resistance member and the heat is conducted. The sheet-like heating element is at first formed as a flat heating sheet. The heating sheet is rounded to form a cylindrical sheet-like heating element. The sheet-like heating element cannot keep its cylindrical shape with this state, so that it is attached on an inner surface of a metallic cylindrical tube for use. However, attaching the sheet-like heating element onto the inner surface of the cylindrical tube is difficult work.

Therefore, a method for fabricating a heat roller has been proposed wherein a cylindrical sheet-like heating element is sandwiched between an inner tube and an outer tube that constitute a duplex tube. Firstly, the inner tube is arranged at the inner surface side of the cylindrical sheet-like heating element, and then, the outer tube is arranged at the outer surface side of this heating element. Then, pressurized fluid is supplied to the inner tube to expand the inner tube and the sheet-like heating element toward the outer tube, whereby the sheet-like heating element is brought into intimate contact with the inner tube and the outer tube. In this fabrication process, it is unnecessary that the sheet-like heating element is brought into contact with the inner tube and with the outer tube, thereby providing a simple assembling operation.

There has been a demand for enhancing thermal efficiency by improving the heat roller including the sheet-like heating element.

SUMMARY OF THE INVENTION

In view of the problems noted above, the present invention aims to provide a heat roller including a sheet-like heating element and capable of enhancing thermal efficiency.

A heat roller according to the present invention includes a cylindrical sheet-like heating element having a resistance member embedded in an insulating member, an inner tube that comes in intimate contact with an inner surface of the sheet-like heating element and an outer tube that comes in intimate contact with an outer surface of the sheet-like heating element, wherein the outer tube is longer than the inner tube.

Further, a heat roller according to the present invention includes a cylindrical sheet-like heating element having a resistance member embedded in an insulating member, an inner tube that comes in intimate contact with an inner surface of the sheet-like heating element and an outer tube that comes in intimate contact with an outer surface of the sheet-like heating element, wherein a thermal expansion coefficient of a material of the inner tube is greater than a thermal expansion coefficient of a material of the outer tube.

Moreover, a heat roller according to the present invention includes a first cylindrical sheet-like heating element having a resistance member embedded in an insulating member, a first tube that comes in intimate contact with an inner surface of the first sheet-like heating element, a second tube that comes in intimate contact with an outer surface of the first sheet-like heating element, a second cylindrical sheet-like heating element that comes in intimate contact with an outer surface of the second tube, and a third tube that comes in intimate contact with an outer surface of the second sheet-like heating element.

Further, a heat roller according to the present invention includes a cylindrical sheet-like heating element having a resistance member embedded in an insulating member, an inner tube that comes in intimate contact with an inner surface of the sheet-like heating element, an outer tube that comes in intimate contact with an outer surface of the sheet-like heating element and a heat-resistant filler layer provided at least between the inner tube and the sheet-like heating element or between the sheet-like heating element and the outer tube.

Moreover, a heat roller according to the present invention includes a cylindrical sheet-like heating element having a resistance member embedded in an insulating member, an inner tube that comes in intimate contact with an inner surface of the sheet-like heating element, an outer tube that comes in intimate contact with an outer surface of the sheet-like heating element and an outer layer disposed at an outer surface of the outer tube.

BRIEF DESCRIPTION OF THE DRAWINGS

Preferred embodiments of the present invention will be described in detail based on the followings, wherein.

BEST MODE FOR CARRYING OUT THE INVENTION

Figure 1:
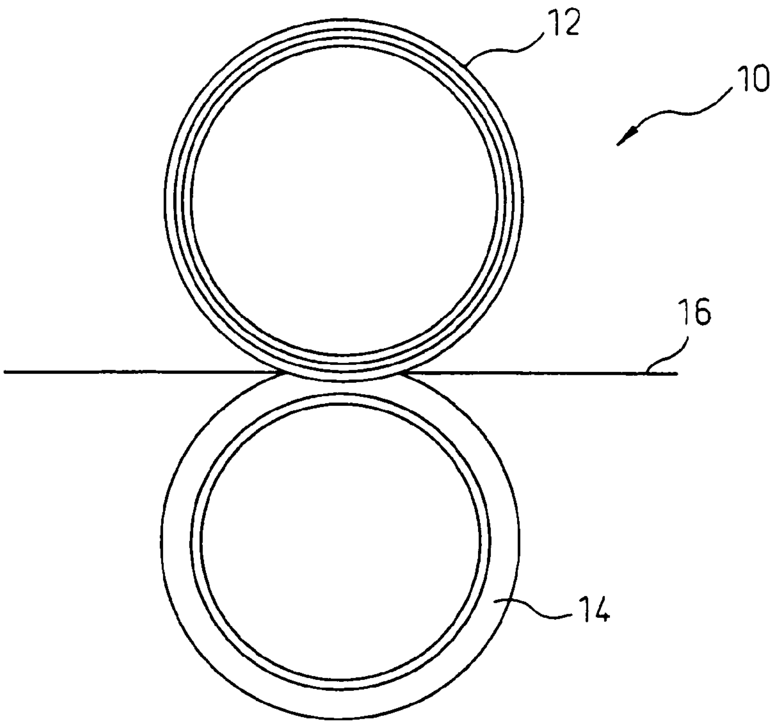
FIG. 1 is a side view showing one example of a fixing device including a heat roller according to the present invention.

FIG. 1 is a side view showing a fixing device including a heat roller according to one embodiment of the present invention. A fixing device 10 includes a heat roller 12 and a pressure roller 14 that is pressed into contact with the heat roller 12 and is covered with rubber. A sheet 16 is transported between the heat roller 12 and the pressure roller 14, whereupon toner carried by the sheet 16 is melted by heat generated by the heat roller 12 and is pressurized between the heat roller 12 and the pressure roller 14, to thereby be fixed.

Figure 2:
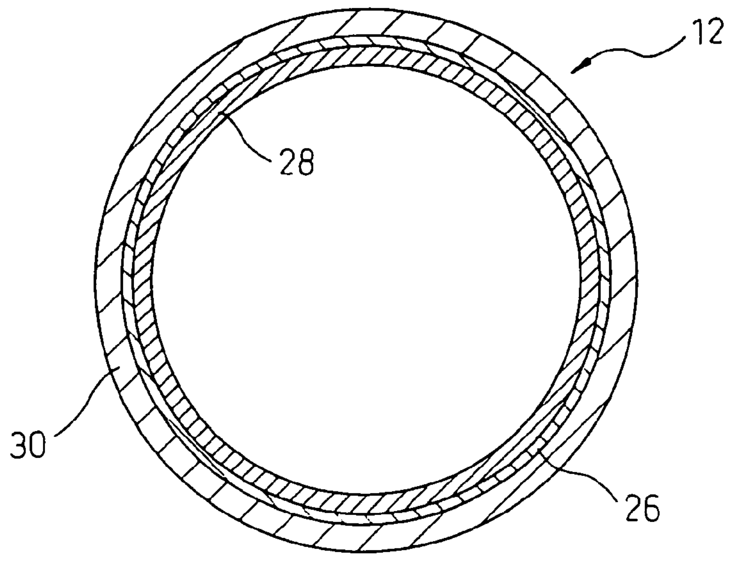
FIG. 2 is a sectional view showing a heat roller.

FIG. 2 is a sectional view showing the heat roller 12 in FIG. 1. The heat roller 12 includes a cylindrical sheet-like heating element 26, an inner tube 28 that comes in intimate contact with the inner surface of the sheet-like heating element 26 and an outer tube 30 that comes in intimate contact with the outer surface of the sheet-like heating element 26.

Figure 3:
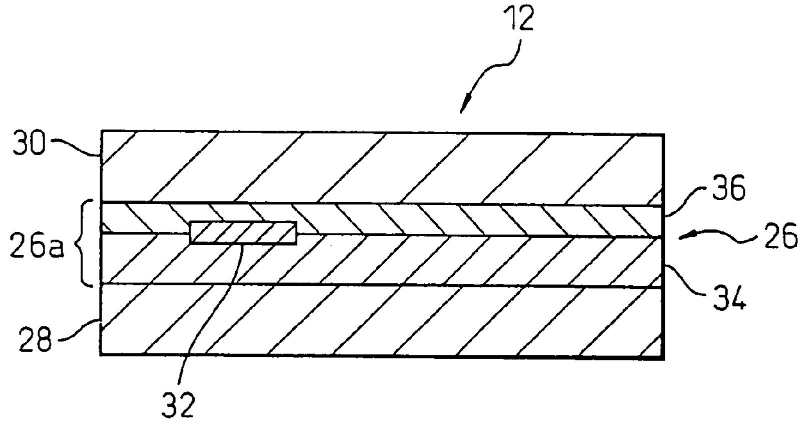
FIG. 3 is a sectional view showing a heat roller taken along a line III-III in FIG. 4.
Figure 4:
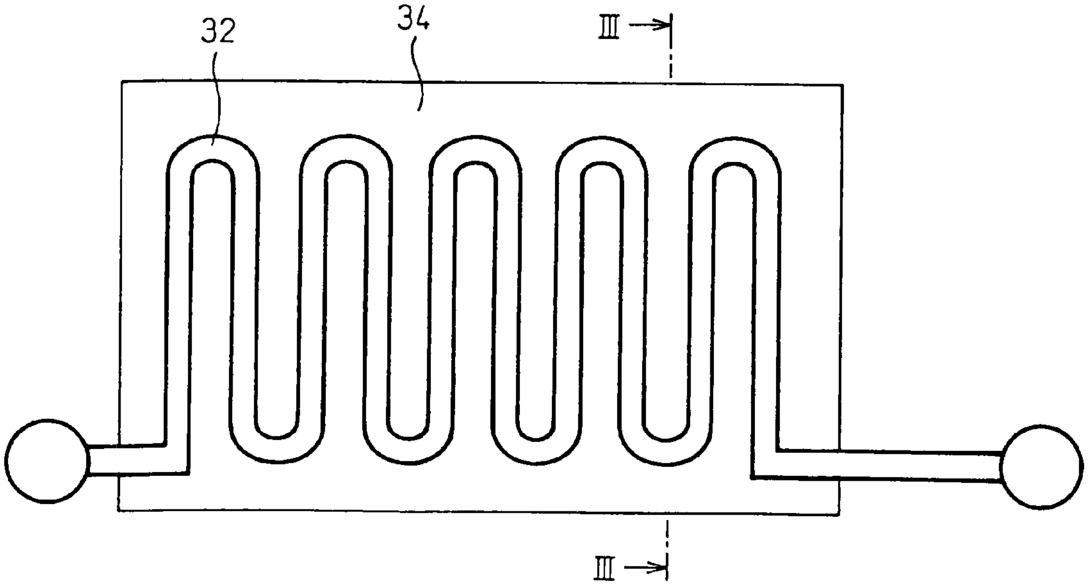
FIG. 4 is a plan view showing a pattern of a resistance member in a sheet-like heating element.

FIG. 3 is a sectional view showing the heat roller 12 taken along a line III-III in FIG. 4. The sheet-like heating element 26 has a heating sheet 26*a* wherein a resistance member 32 is embedded in insulating members 34 and 36. The resistance member 32 is formed on the insulating member 34 and covered with the insulating member 36. For example, the insulating members 34 and 36 are made of a polyimide type heat-resistant resin and the resistance member 32 is made of stainless steel. The heating sheet 26*a* is formed as a flat sheet. It is rounded to join both ends of the sheet, to thereby be formed into the cylindrical sheet-like heating element 26. The inner tube 28 is made of a relatively soft aluminum type material so as to be deformable, while the outer tube 30 is made of a relatively hard aluminum type material such that the heat roller 12 keeps the cylindrical shape. For example, the inner tube 28 is made of pure aluminum (JIS designation 1050, coefficient of linear expansion 23.6), while the outer tube 30 is made of Al—Mg—Si (JIS designation 6063, coefficient of linear expansion 24.4). The outer tube 30 is made of a material having a strength greater than that of the inner tube 28.

FIG. 4 is a plan view showing a pattern of the resistance member 32 on the insulating member 34 of the heating sheet 26*a*. The resistance member 32 is formed on the insulating member 34 so as to meander. The insulating member 36 is laminated on the insulating member 34 having the resistance member 32 formed thereon. Electric current flows through both ends of the resistance member 32, so that the resistance member 32 generates heat, and the generated heat is transmitted to the sheet 16 via the outer tube 30.

The heat roller 12 having the sheet-like heating element 26, inner tube 28 and outer tube 30 is fabricated by a tube expansion method utilizing an outer shape die for tube expansion and fluid pressure. At first, the inner tube 28 is arranged at the inside of the cylindrical sheet-like heating element 26, while the outer tube 30 is arranged at the outside thereof, to thereby form a heat roller assembly. At this time, a gap may be formed between the sheet-like heating element 26 and the inner tube 28 and a gap may be formed between the sheet-like heating element 26 and the outer tube 30, whereby the heat roller assembly can easily be assembled. Subsequently, the heat roller assembly is inserted into an outer shape die for tube expansion, and pressurized fluid (e.g., water) is supplied into the inner tube 28 at a pressure of 60 $Kg/cm^2$. Then, the inner tube 28 is expanded and brought into intimate contact with the sheet-like heating element 26 to thereby expand the sheet-like heating element 26, whereby the sheet-like heating element 26 is brought into intimate contact with the outer tube 30 to thereby expand the outer tube 30. The expansion of the outer tube 30 is restricted by the outer shape die for tube expansion. As described above, the inner tube 28 is brought into intimate contact with the sheet-like heating element 26 and the sheet-like heating element 26 is brought into intimate contact with the outer tube 30.

Figure 5:
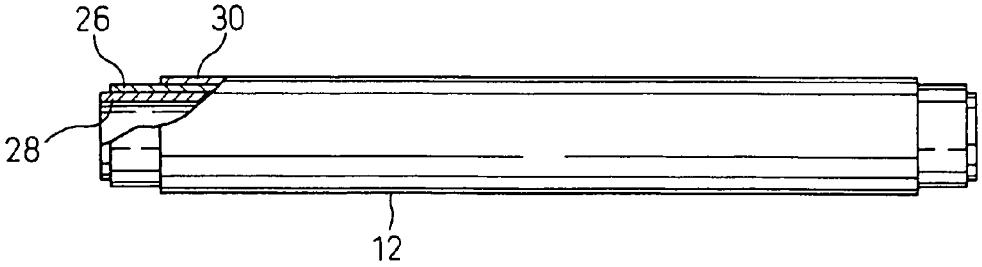
FIG. 5 is a partial sectional front view showing one example of a heat roller.

FIG. 5 is a partial sectional front view showing one example of the heat roller 12. In the heat roller 12 shown in FIG. 5, the outer tube 30 is shorter than the inner tube 28.

Figure 6:
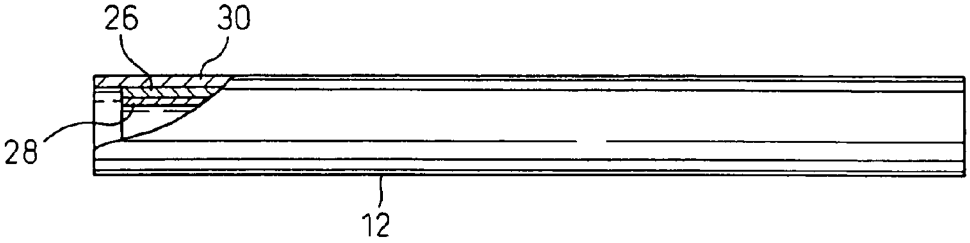
FIG. 6 is a partial sectional front view showing another example of a heat roller.

FIG. 6 is a partial sectional front view showing another example of the heat roller 12. In the heat roller 12 shown in FIG. 6, the outer tube 30 is longer than the inner tube 28.

As a result of considering the relationship between the length of the outer tube 30 and the length of the inner tube 28 in the present invention, it was found that the preferable configuration was such that the outer tube 30 was longer than the inner tube 28. According to the example shown in FIG. 6, the sheet-like heating element 26 is protected by the outer tube 30, so that it cannot be seen from the outside. The thermal capacity of the inner tube 28 is reduced, while the thermal capacity of the outer tube 30 is increased, whereby it becomes possible to efficiently transmit the thermal capacity required for a fixing operation to the outer tube 30. The temperature at the end section of the outer tube 30 is likely to lower. Therefore, the thermal capacity at both ends of the outer tube 30 is increased to widen a temperature margin to heat radiation from both ends of the outer tube 30, thereby improving non-uniform temperature.

Figure 7:
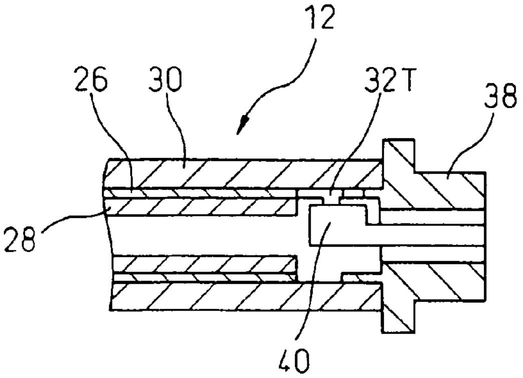
FIG. 7 is a view showing the heat roller in FIG. 6 and a support member.

FIG. 7 is a view showing the heat roller 12 in FIG. 6 and a support member 38. The outer tube 30 of the heat roller 12 is supported by the support member 38 having a flange. A terminal section 32T extending from the resistance member 32 of the sheet-like heating element 26 of the heat roller 12 extends outwardly from the end section of the inner tube 28, and is connected to a power supply member 40.

Figure 8:
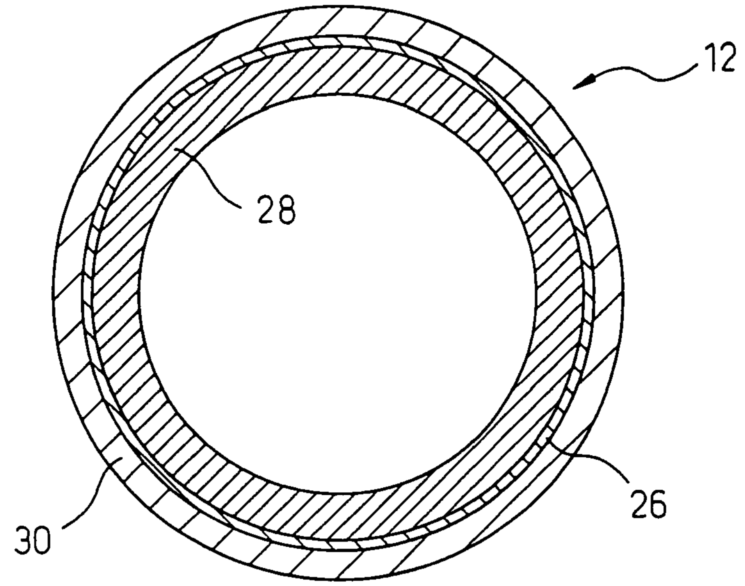
FIG. 8 is a sectional view showing one example of a heat roller.

FIG. 8 is a sectional view showing one example of the heat roller 12. In the heat roller 28 in FIG. 8, the thickness of the outer tube 30 is smaller than the thickness of the inner tube 28.

Figure 9:
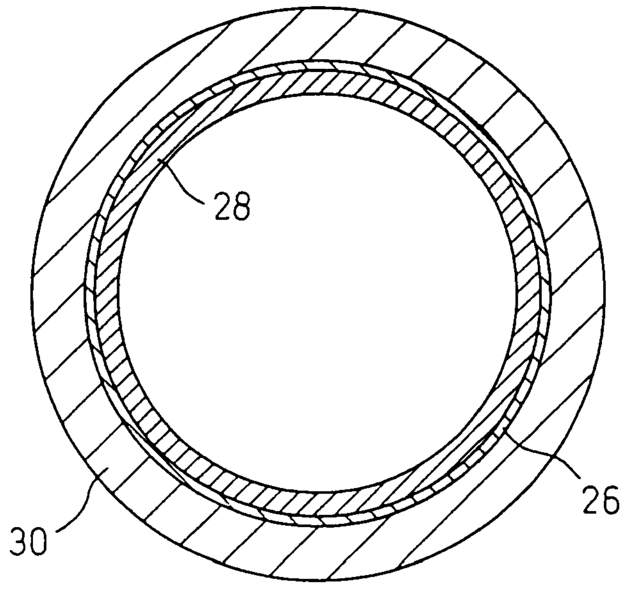
FIG. 9 is a sectional view showing another example of a heat roller.

FIG. 9 is a sectional view showing another example of the heat roller 12. In the heat roller 28 in FIG. 9, the thickness of the outer tube 30 is greater than the thickness of the inner tube 28.

In the relationship between the thickness of the outer tube 30 and the thickness of the inner tube 28 too, the preferable configuration is such that the thickness of the outer tube 30 is greater than that of the inner tube 28 shown in FIG. 9. In this case too, the thermal capacity of the inner tube 28 is reduced, while the thermal capacity of the outer tube 30 is increased, whereby it becomes possible to efficiently transmit the thermal capacity required for a fixing operation to the outer tube 30. However, the temperature at the end section of the outer tube 30 is likely to lower from the temperature at the center of the outer tube 30, and therefore, the non-uniform temperature at the outer tube 30 is desired to be reduced.

Figure 10:
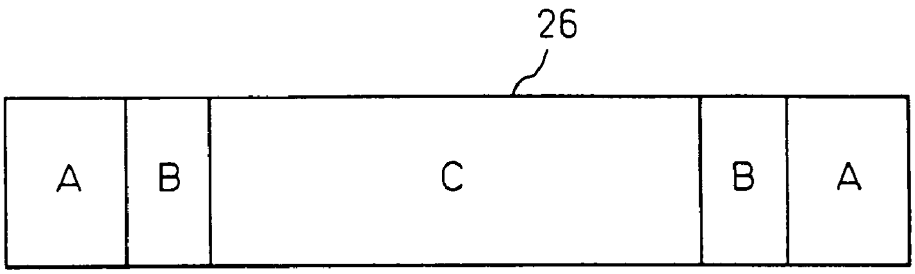
FIG. 10 is a view showing an area of a sheet-like heating element of a heat roller used in a test.
Figure 11:
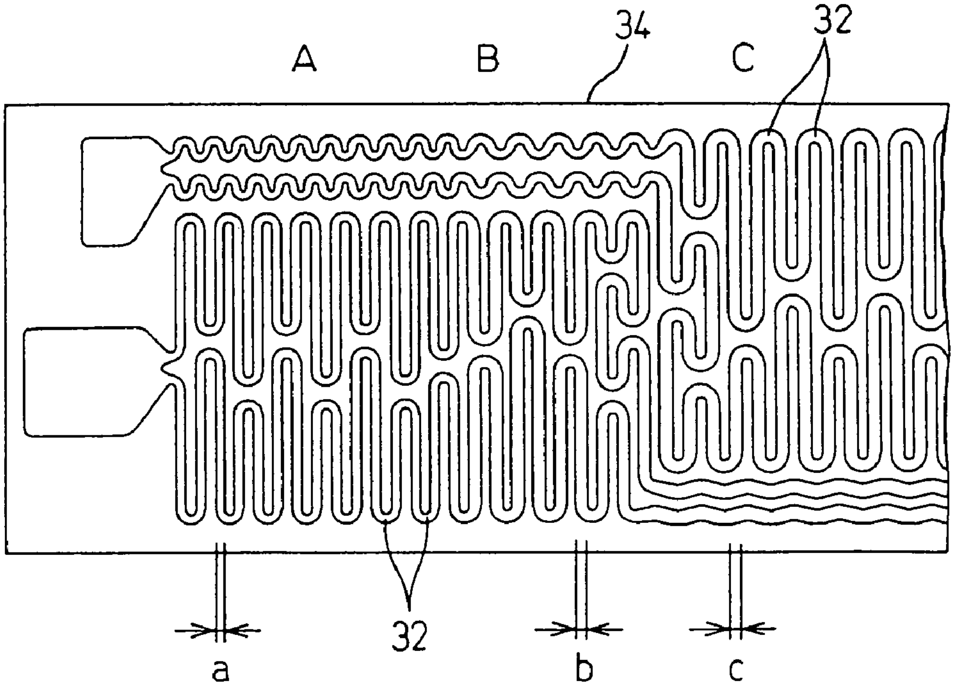
FIG. 11 is a view showing a pattern of a resistance member in a sheet-like heating element of a heat roller.
Figure 12:
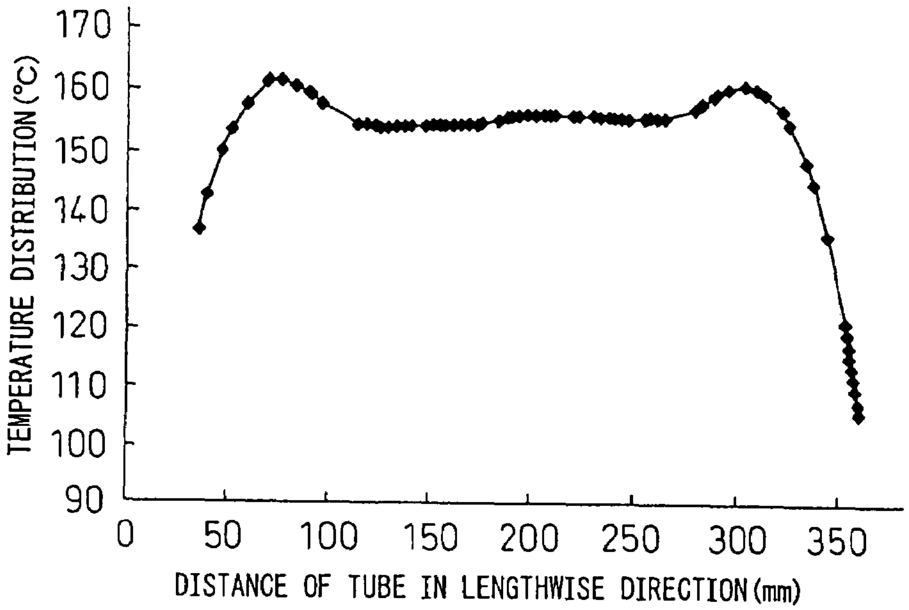
FIG. 12 is a view showing a temperature distribution in sample 1.
Figure 13:
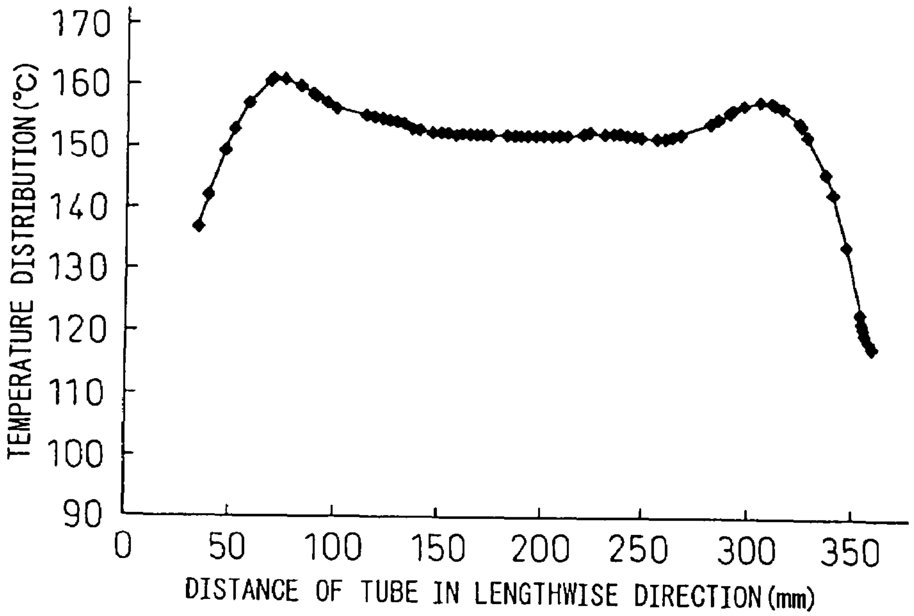
FIG. 13 is a view showing a temperature distribution in sample 2.
Figure 14:
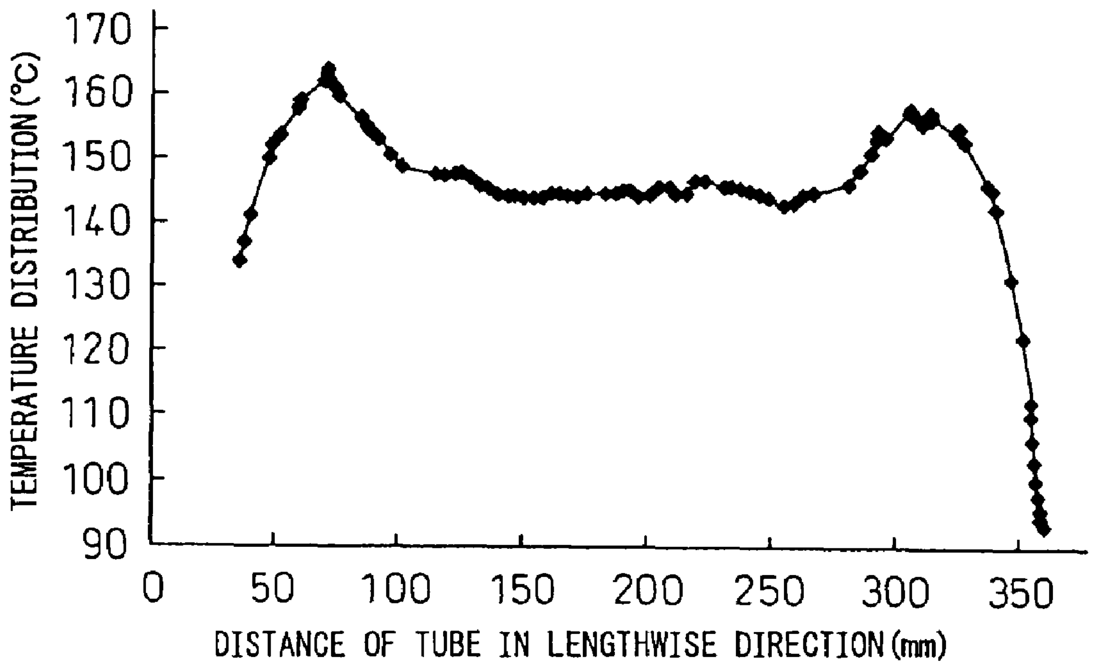
FIG. 14 is a view showing a temperature distribution in sample 3.

Subsequently explained is a test result of a heating temperature distribution of the heat roller 12. FIG. 10 shows an area of the sheet-like heating element 26 of the heat roller 12 used for the test, while FIG. 11 is a view showing a pattern of the resistance member 32 in the sheet-like heating element 26 of the heat roller 12. In FIG. 10, the sheet-like heating element 26 is divided into an area A positioned at both end sections, an area B positioned inside of the area A and an area C positioned at the center. In FIG. 11, the pattern of the resistance member 32 of the sheet-like heating element 26 is set such that the heating density in the area A is the highest, the heating density in the area B is the second highest and the heating density in the area C is low. For example, the resistance member 32 is formed to have a width of a line in the area A of 1.46 mm, a width of a line in the area B of 1.46 mm, and a width of a line in the area C of 2.03 mm. The resistance member 32 is made of a stainless steel.

In the test, sample 1, sample 2 and sample 3 were prepared for the heat roller 12.

| | | |
|---|---|---|
| Sample 1 | Length of outer tube: | 380 mm |
| | Length of inner tube: | 340 mm |
| Sample 2 | Length of outer tube: | 340 mm |
| | Length of inner tube: | 380 mm |
| Sample 3 | Length of outer tube: | 340 mm |
| | Length of inner tube: | 380 mm |

The inner tube 28 was made of pure aluminum and the outer tube 30 was made of Al—Mg—Si in the samples 1 and 2. The inner tube 28 and the outer tube 30 were made of stainless steel in the sample 3. The thicknesses of the inner tube 28 and the outer tube 30 were 0.5 mm.

Current was made to flow through these samples, and when the temperature of some position of the heat roller 12 reached 160° C., the temperature distribution to the distance in the lengthwise direction of the heat roller 12 was measured. According to the pattern of the resistance member 32 in FIGS. 10 and 11, the temperature represented a peak at both ends of the heat roller 12, but it became low at the center. The peak temperature at both ends and the temperature at the center were as follows (unit: ° C.).

| | Peak temperature | Temperature at center | Temperature difference |
|---|---|---|---|
| Sample 1 | 161.6° C. | 155.7° C. | 5.9° C. |
| Sample 2 | 161.1° C. | 151.9° C. | 9.2° C. |
| Sample 3 | 163.9° C. | 141.3° C. | 22.0° C. |

From this result, non-uniform temperature is reduced in the heat roller in which the outer tube 30 is longer than the inner tube 28 like the sample 1. It was found that it was preferable that the outer tube 30 was longer than the inner tube 28 in order to improve non-uniform temperature. Further, non-uniformity in temperature was increased in the case of changing the material like the sample 3. The considered reason is that SUS is low in thermal conductivity compared to aluminum. The SUS is advantageous in thermal capacity, but considering a start-up characteristic from when a power switch is turned on, the use of aluminum is advantageous. (The thermal conductivity of the SUS is 14 W/m° C., while that of the aluminum is 210 W/m° C.)

The materials for the inner tube 28 and the outer tube 30 are required to be selected by considering its strength and expansion to heat. The outer tube 30 is made of a material having a strength greater than the inner tube 28. Further, if the thermal expansion coefficient of the material for the inner tube 28 is greater than that of the material for the outer tube 30, the inner tube 28 whose temperature increases upon the use of the heat roller 12 further expands, thereby providing strong intimate contact between the inner tube 28 and the sheet-like heating element 26. As a result, a temperature transmission becomes uniform as a fixing device. Therefore, the thermal expansion coefficient of the material used for the inner tube 28 is made equal to or greater than that of the material used for the outer tube 30.

Figure 15:
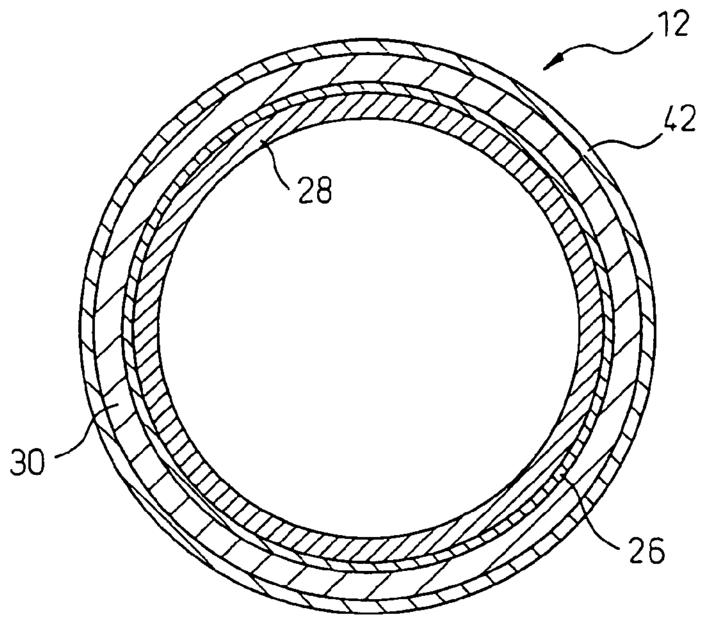
FIG. 15 is a view showing an example wherein an outer layer is provided at the outer surface of an outer tube of a heat roller.

FIG. 15 shows an example wherein an outer layer 42 is provided at the outer surface of the outer tube 30 of the heat roller 12. The outer layer 42 is formed by coating fluororesin.

Figure 16:
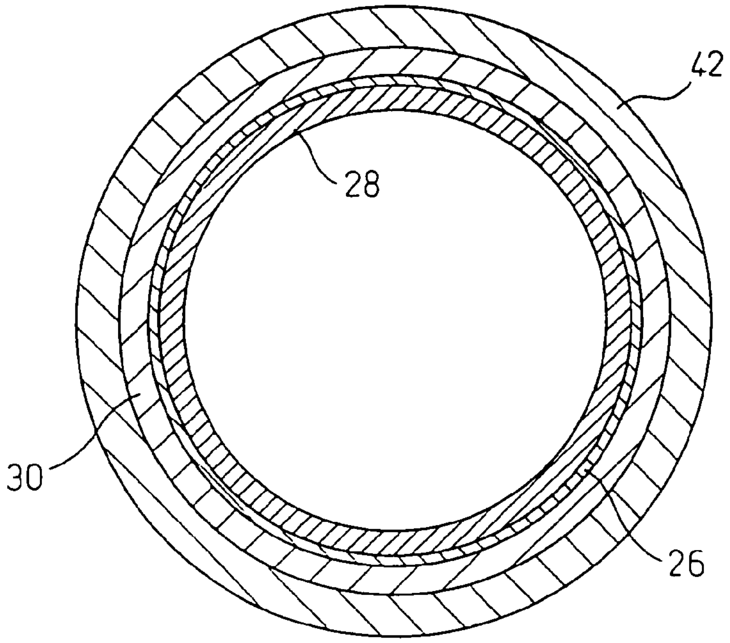
FIG. 16 is a view showing another example wherein an outer layer is provided at the outer surface of an outer tube of a heat roller.

FIG. 16 shows another example wherein the outer layer 42 is provided at the outer surface of the outer tube 30 of the heat roller 12. The outer layer 42 is formed by silicon rubber. As shown in FIGS. 15 and 16, providing the outer layer 42 at the outer surface of the outer tube 30 can cope with various combinations such as a layout of the heat roller 12 in the fixing device, nip width and toner for use. Further, optimizing the thickness of the silicon rubber causes no problem in irregularities of the pattern of the resistance member 32 that appears on the surface of the outer tube 30 of a duplex-tube heat roller 12 when the outer tube 30 is made thin, whereby the non-uniform temperature is hardly generated and the temperature-rising time can be shortened with the printing quality assured.

Figure 17:
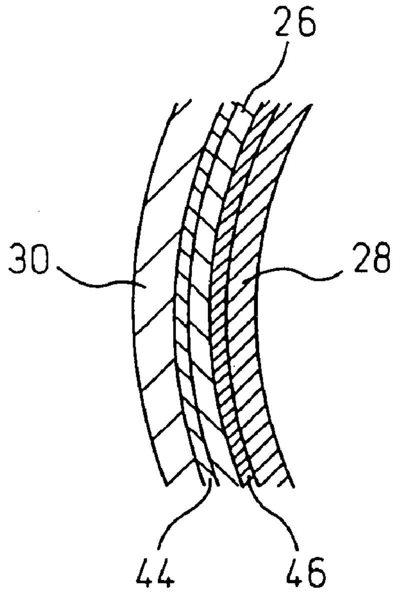
FIG. 17 is a view showing an example wherein a heat-resistant filler layer is provided between a cylindrical tube and a sheet-like heating element.
Figure 18:
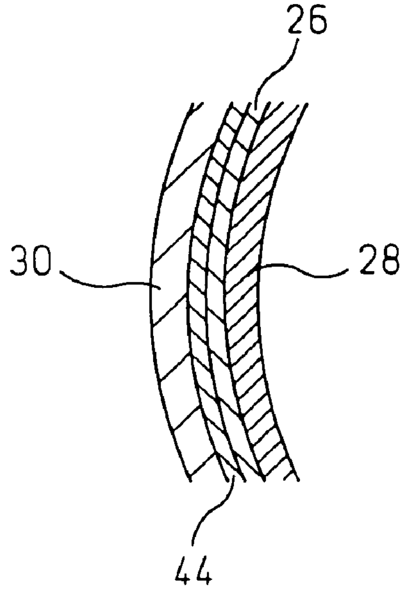
FIG. 18 is a view showing another example wherein a heat-resistant filler layer is provided between a cylindrical tube and a sheet-like heating element.

FIGS. 17 and 18 are views each showing an example wherein a heat-resistant filler layer is provided between the cylindrical tube and the sheet-like heating element 26. In FIG. 17, a heat-resistant filler layer 44 for assisting the intimate contact is provided between the outer tube 30 and the sheet-like heating element 26, while a heat-resistant filler layer 46 for assisting the intimate contact is provided between the sheet-like heating element 26 and the inner tube 28. The filler layers 44 and 46 prevent extraordinary increase in temperature due to heat in the case of poor intimate contact, and further make it possible to uniformly and stably transmit heat.

In FIG. 18, the heat-resistant filler layer 44 for assisting the intimate contact is only provided between the outer tube 30 and the sheet-like heating element 26. Further, air vent ports can be formed at the inner tube 28 with a suitable size and a space in the configurations shown in FIGS. 17 and 18. This is a design for preventing the generation of air bubbles to thereby provide even more satisfactory intimate contact.

FIG. 3 shows an example wherein a thickness of the heat-resistant resin film of each insulating member 34, 36 in the sheet-like heating element 26 is changed. The use of the heat-resistant resin film as the insulating material enables to select the film thickness. The insulating member 36 on the side of the outer tube 30 that is required to positively transmit heat is made thin, while the insulating member 34 on the side of the inner tube 30 that is loaded upon the fabrication of the duplex tube is made thick, whereby the stability of the product is enhanced and heat transfer coefficient is increased. Therefore, a temperature-rising time can be shortened. The thickness of the heat-resistant resin film is controlled without using a complicated mechanism or control, thereby enabling a further optimum thermal design.

Figure 19:
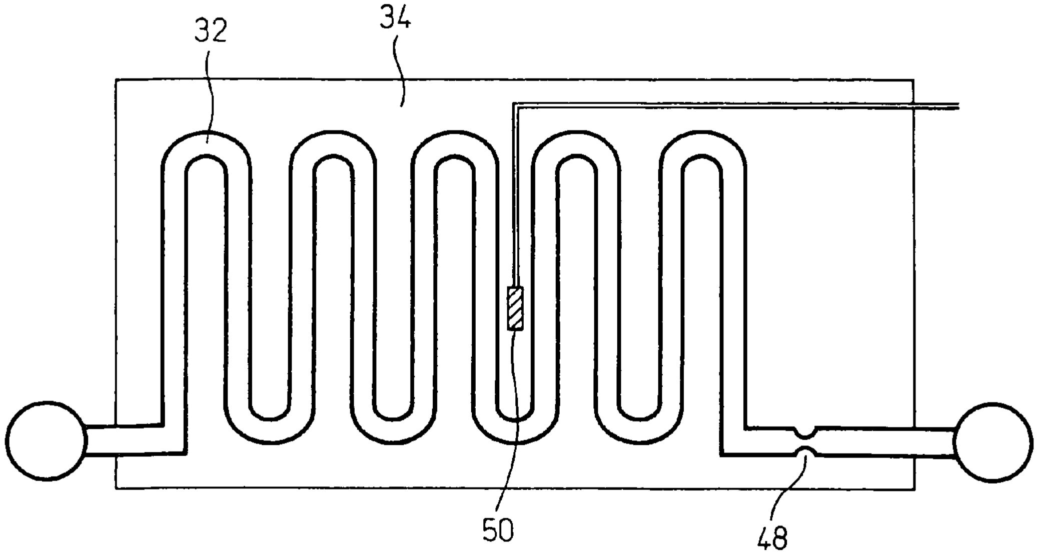
FIG. 19 is a view showing an example wherein a fuse and a temperature sensor are provided to a sheet-like heating element.

FIG. 19 is a view showing an example wherein a fuse 48 and temperature sensor 50 are provided at the sheet-like heating element 26. The fuse 48 is formed by sectionally reducing a volume of a part of the line of the resistance member 32 for causing a braking of the fuse 48 when current excessively flows. The fuse 48 is formed by reducing the width of the line of the resistance member 32, not reducing the height of the line, to thereby prevent the pattern of the resistance member 32 from being brought into poor intimate contact after the fabrication of the heat roller 12. Further, the width of the line is reduced so that secondary processing in the height direction is not required upon forming the pattern of the resistance member 32, thereby leading to a low cost. A fuse function is conventionally provided at the outside of the heat roller 12. However, the fuse 48 is formed as a part of the pattern of the resistance member 32 in the present invention, thereby being capable of immediately cutting off the energization to the resistance member 32 with respect to extraordinary heating, whereby safety is also remarkably improved.

Figure 21:
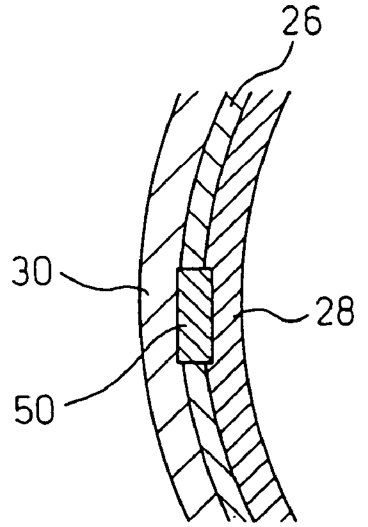
FIG. 21 is a view showing an arrangement of a temperature sensor.

FIG. 21 is a view showing an arrangement of the temperature sensor 50. In FIGS. 19 and 21, the temperature sensor 50 is formed of a thermistor and provided in the same layer of the resistance member 32 between the insulating members 34 and 36. Disposing the temperature sensor 50 in the same layer as the pattern of the resistance member 32 provides the heat roller 12 having incorporated therein the temperature sensor after the formation of the duplex tube, so that there is no need to newly use the temperature sensor externally, and therefore, design freedom of the device is remarkably enhanced. Moreover, this configuration can also eliminate a problem of deteriorating coating due to sliding friction between the external temperature sensor and the outer peripheral surface of the heat roller when the external temperature sensor is used.

Moreover, the temperature sensor 50 is brought close to the resistance member 32 that is a heating source, thereby being capable of performing efficient temperature control. An external temperature sensor generally used is formed such that a sensor section is attached to an elastic member and its outer periphery is coated with a protecting layer. In the present invention, the elastic member is unnecessary, and the insulating members 34 and 36 sandwiching the resistance member 32 can be used as a sensor protecting layer, thereby being advantageous in view of cost, including assembling performance.

Figure 20:
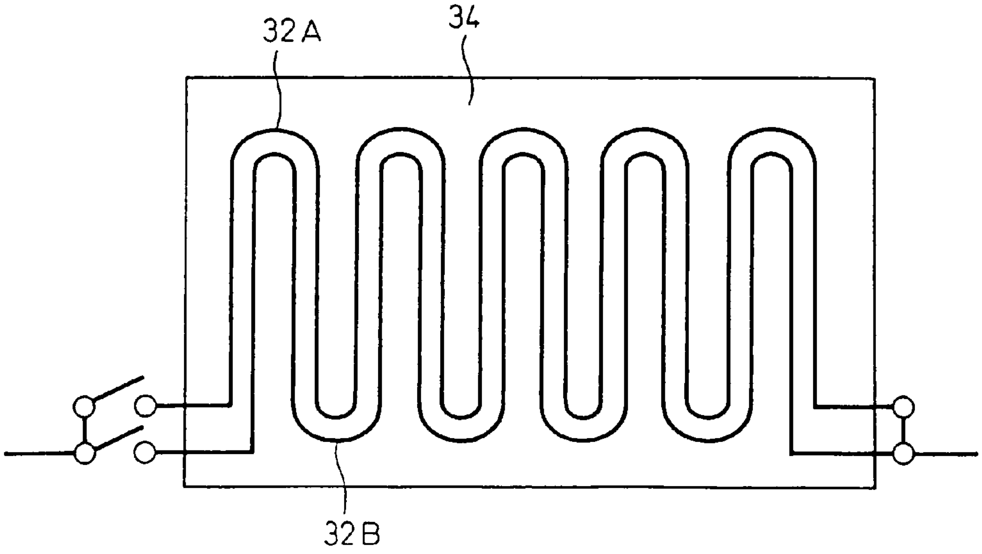
FIG. 20 is a view showing an example wherein a sheet-like heating element is formed of plural resistance members connected in parallel to each other.

FIG. 20 is a view showing an example wherein the sheet-like heating element 26 is formed of plural resistance members 32A and 32B connected in parallel to each other. For example, when a rapid increase in temperature is required such as upon turning on or upon a print command, current is made to flow through both heater patterns A and B in this configuration. If the design is such that a fixing temperature can be assured only by the energization to the heater pattern A after reaching a predetermined temperature, power consumption can be reduced.

Figure 22:
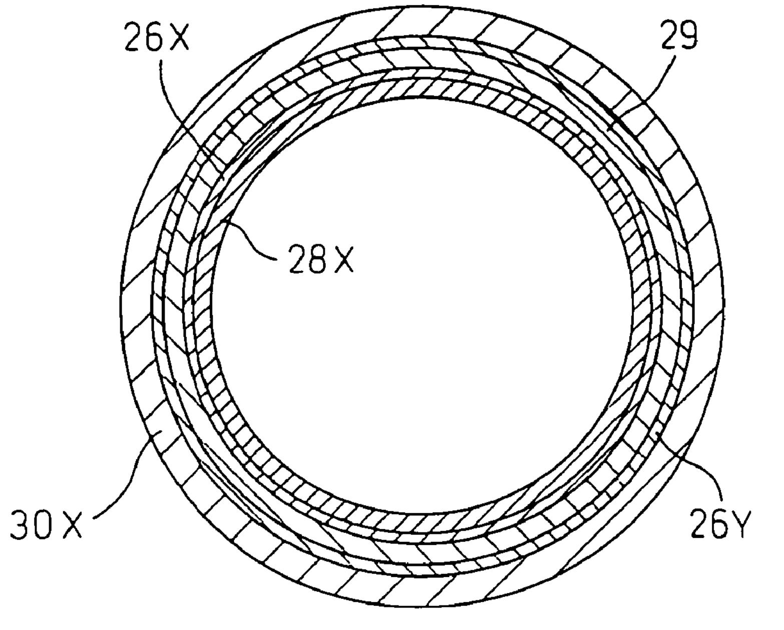
FIG. 22 is a view showing an example of a triple-tube heat roller.

FIG. 22 is a view showing an example of a triple-tube heat roller 12. The triple-tube heat roller 12 includes a first cylindrical sheet-like heating element 26X having the resistance member 32 embedded in the insulating members 34 and 36, a first tube (inner tube) 28X that is in intimate contact with the inner surface of the first sheet-like heating element 26X, a second tube 29 (middle tube) that is in intimate contact with the outer surface of the first sheet-like heating element 26X, a second cylindrical sheet-like heating element 26Y that is in intimate contact with the outer surface of the second tube 29 and a third tube (outer tube) 30X that is in intimate contact with the outer surface of the second sheet-like heating element 26Y. Each of the first and second sheet-like heating elements 26X and 26Y has the configuration same as that of the above mentioned sheet-like heating element 2.

The pattern of the resistance member 32 of the first sheet-like heating element 26X is different from the pattern of the resistance member 32 of the second sheet-like heating element 26Y. For example, a pattern C of the resistance member 32 of the second sheet-like heating element 26Y is formed to have a high heating density at its edge section as explained with reference to FIGS. 10 and 11, while a pattern D of the resistance member 32 of the first sheet-like heating element 26X is formed to have a uniform heating density. The pattern C is suitable for normal printing, while the pattern D is utilized for a preheating upon continuous printing. Therefore, only the pattern C is used for printing on a single sheet, while both patterns C and D are used for continuously printing on plural sheets. It becomes possible to hold down the thermal loss upon the continuous printing to the minimum, and further, printing operation is possible immediately after the sheet is inserted.

Moreover, in a conventional heat roller using a halogen lamp, it takes much time for a thermal design and a period for trial manufacture of the fixing device including a change in distribution of light of the halogen lamp if there is a change in speed or specification. In the triple-tube heat roller 12 according to the present invention, the sheet-like heating element having several types of heating patterns is prepared in advance, whereby there is no need to newly make a trial product of a heat source because of its combination, which leads to a reduction in the period for trial manufacture and cost.

Figure 23:
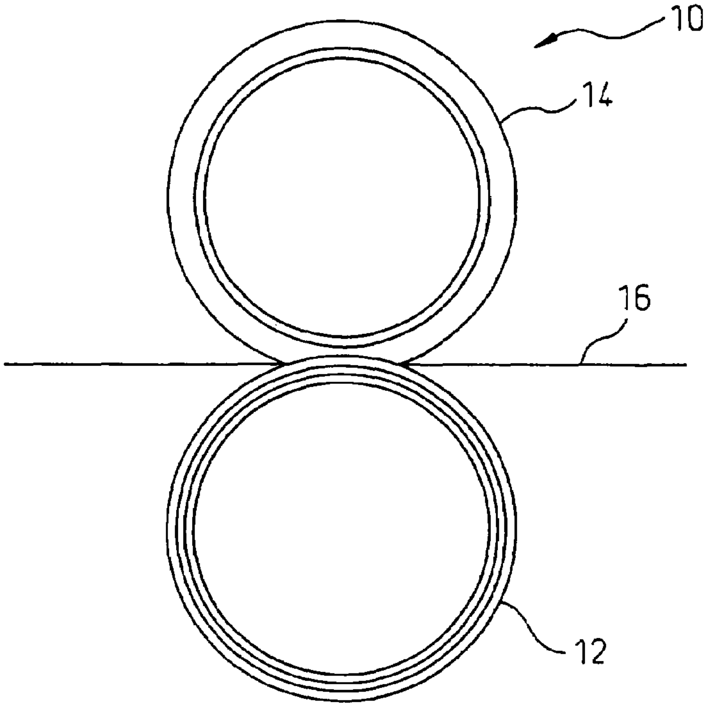
FIG. 23 is a view showing an example of a fixing device including a heat roller.

FIG. 23 is a view showing an example of a fixing device including the heat roller 12 having the sheet-like heating element 26. The fixing device 10 includes the heat roller 12 and the pressure roller 14. The heat roller 12 is arranged above the pressure roller 14 in FIG. 1, but in FIG. 23, the heat roller 12 is arranged below the pressure roller 14.

Figure 24:
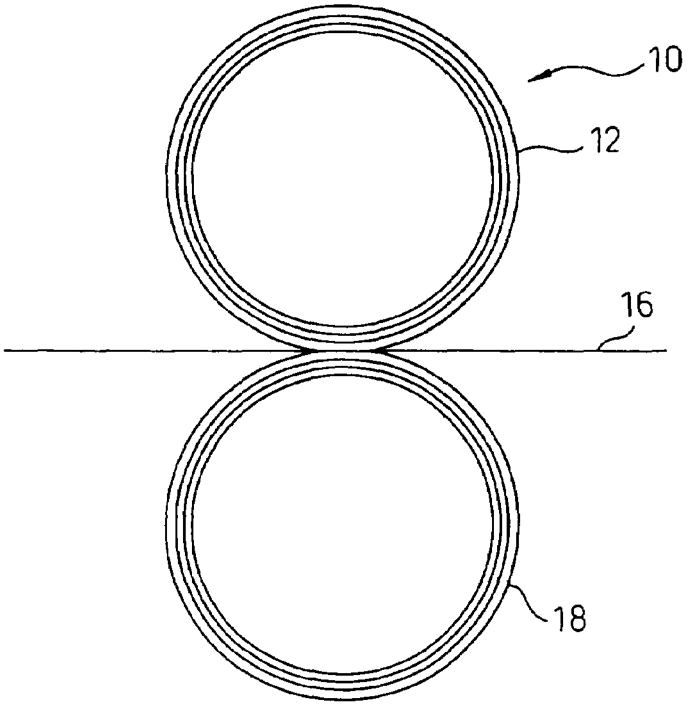
FIG. 24 is a view showing an example of a fixing device including a heat roller.

FIG. 24 is a view showing an example of a fixing device including the heat roller 12 having the sheet-like heating element 26. The fixing device 10 includes the heat roller 12 and a heat roller 18. The heat roller 18 has a configuration approximately same as that of the heat roller 12.

The fixing devices 10 shown in FIGS. 1 and 23 are used in a monochrome printer and the like. A fixing device free from waiting time can be provided by heating a printing surface or a back surface of the sheet 16. Further, the fixing device 10 shown in FIG. 24 is used in a color printer and a high-speed printer that require an amount of fixing heat. Effective fixing can be executed by simultaneously heating the printing surface and the back surface of the sheet 16.

Figure 25:
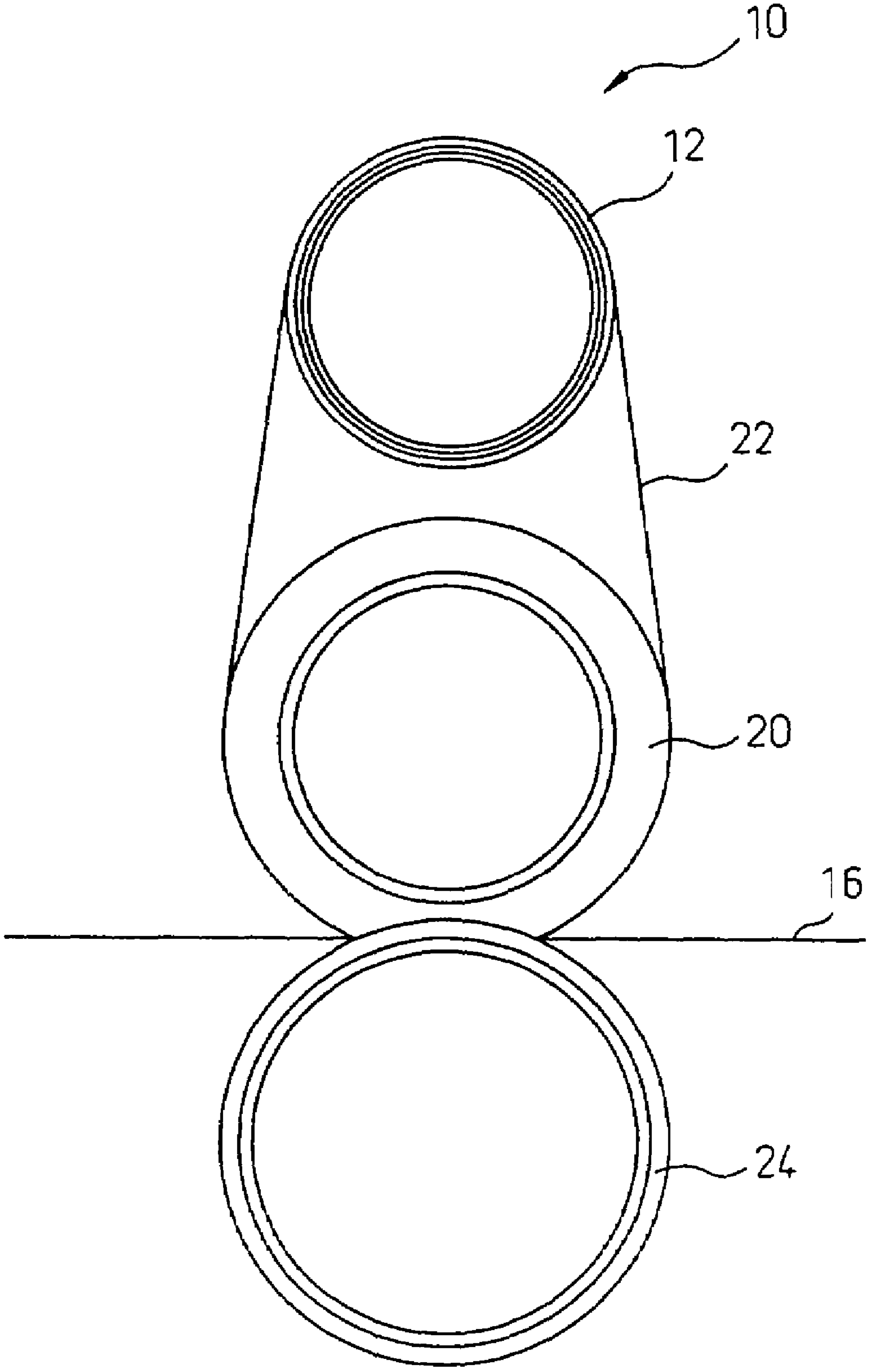
FIG. 25 is a view showing an example of a fixing device including a heat roller.
Figure 26:
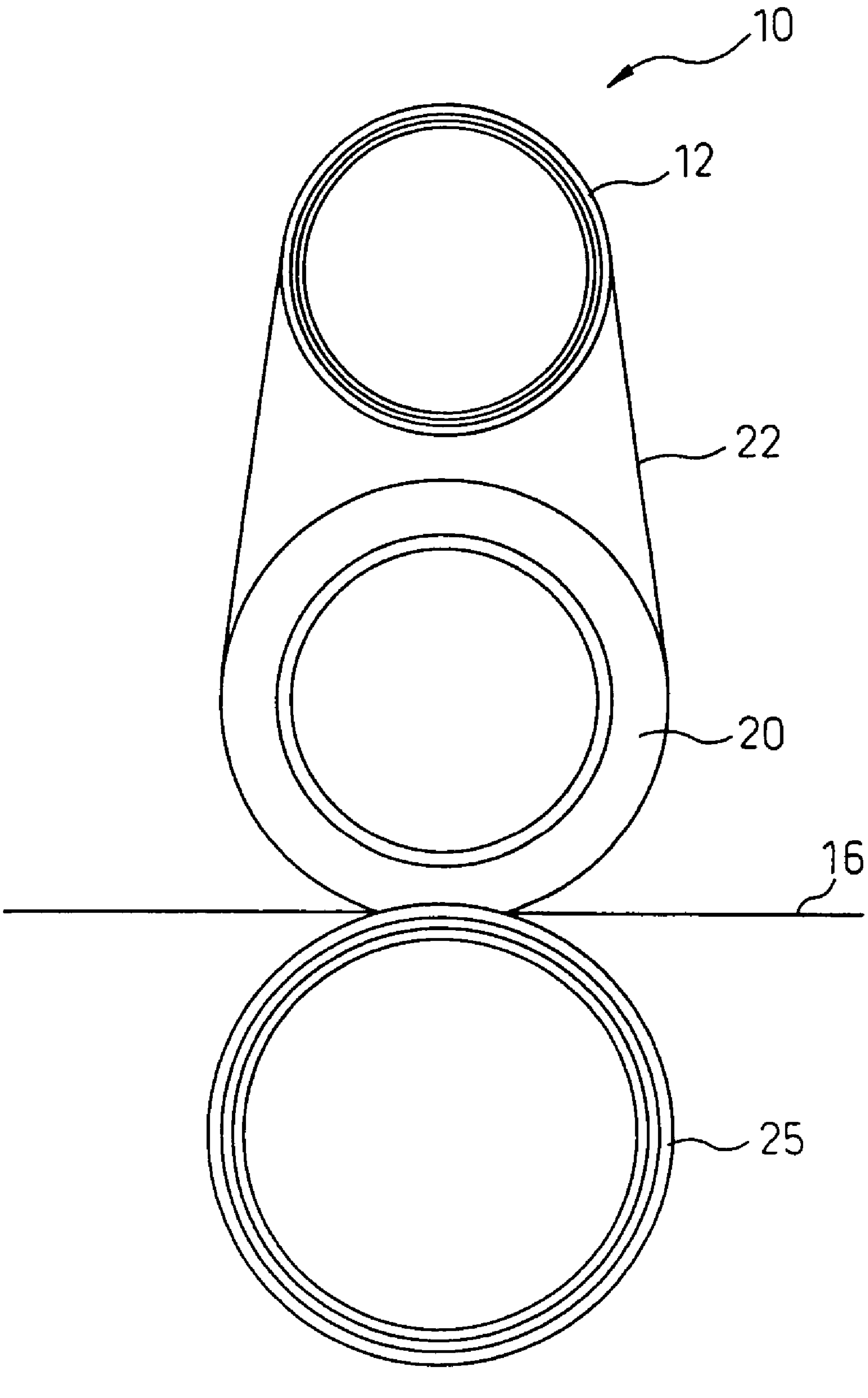
FIG. 26 is a view showing an example of a fixing device including a heat roller.

FIGS. 25 and 26 are views each showing an example wherein the heat roller 12 is used for a belt-type fixing device 10. In FIG. 25, the belt-type fixing device 10 has the heat roller 12, fixing roller 20, belt 22 bridged to the heat roller 12 and the fixing roller 20 and a pressure roller 24 that is pressed in contact with the fixing roller 20 via the belt 22. In this case, heat generated by the heat roller 12 is transmitted to the sheet 16 via the belt 22, whereby toner carried by the sheet 16 is melted by the heat generated by the heat roller 12, pressurized, and then, fixed.

In FIG. 26, a heat roller 25 is used instead of the pressure roller 24 in FIG. 25. The heat roller 25 can be configured in the same manner as the heat roller 12.

In the belt-type fixing device 10, the subject to be heated is the endless belt 22 for fixing operation having low thermal capacity, thereby being capable of shortening a temperature-rising period, and consequently, a temperature-rising period can be further shortened.

Figure 27:
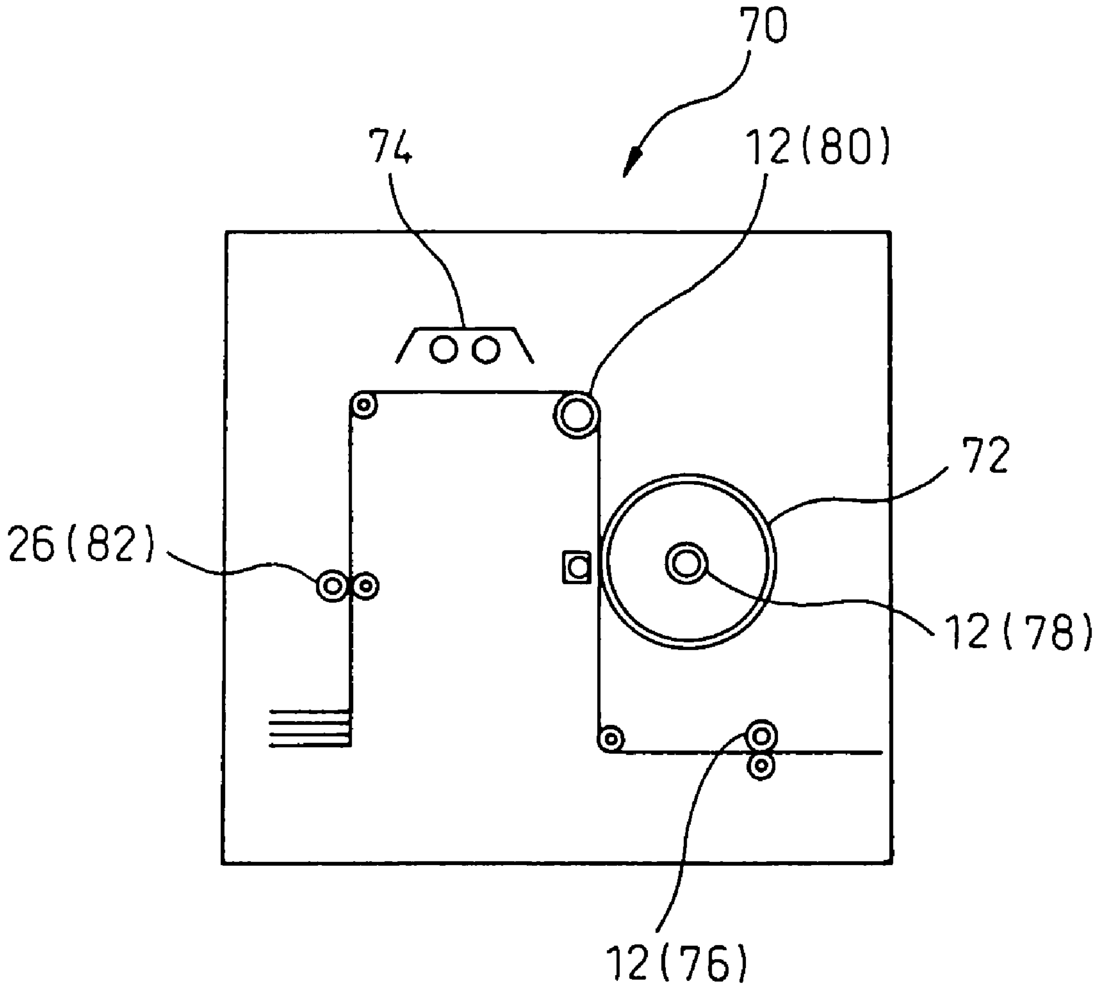
FIG. 27 is a view showing an example of a device including a heat roller.

FIG. 27 is a view showing another device 70 including the heat roller 12 having the sheet-like heating element 26. The device 70 is, for example, a large-sized electrophotographic printer, wherein the heat roller 12 is used at the position other than the fixing device. In FIG. 27, there are a photoreceptor drum 72 and a flash lamp 74 for fixing operation. The heat roller 12 is used for a sheet moisture removing roller 76 arranged at the upstream side with respect to the photoreceptor drum 72. Further, the heat roller 12 is used for a drum condensation preventing roller 78 arranged in the photoreceptor drum 72. Moreover, the heat roller 12 is used for a preheat roller 80 arranged between the photoreceptor drum 72 and the flash lamp 74 for fixing operation. Additionally, the heat roller 12 is used for a sheet wrinkle smoothing roller 82 arranged at the downstream side with respect to the flash lamp 74 for fixing operation.

As described above, the heat roller 12 can be used for (a) removing moisture on the sheet before the transfer, (b) preventing the generation of dew drops on the photoreceptor drum, (c) executing the preheating before the flash fixing, and (d) smoothing the wrinkle on the medium after the fixing operation. The heat roller 12 is not necessarily be used for all of the above mentioned examples. Further, the application of the heat roller 12 is not limited to the examples shown in FIG. 27. The sheet-like heating element 26 can freely and simply set the resistance value, whereby it has high general-purpose properties at the position other than the fixing device.

Figure 28:
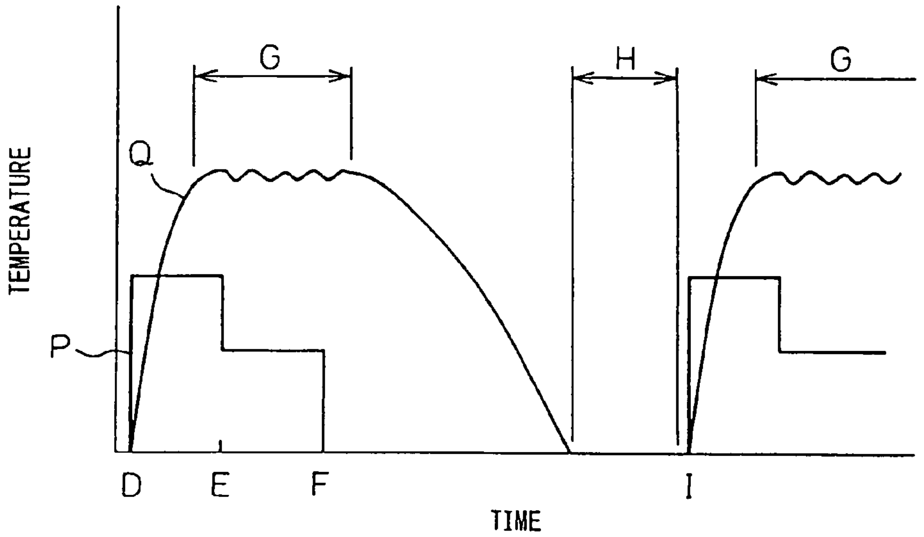
FIG. 28 is a view showing an example of a change in power consumption of a fixing device including a heat roller having a sheet-like heating element and a temperature change of the heat roller.

FIG. 28 is a view showing an example of a change of power consumption of the fixing device 10 including the heat roller 12 having the sheet-like heating element 26 and the temperature change of the heat roller 12. A curve P represents the power consumption and a curve Q represents the temperature of the heat roller 12. When a print command is inputted, maximum electric power for rising the temperature of the heat roller up to the fixing temperature is supplied (point D), the supplied electric power is controlled at the time when the temperature of the heat roller reaches the fixing temperature (point E), and then, the electric power is stopped to be supplied after the completion of the printing (point F). Symbol G represents a printing period, and symbol H represents a waiting time. When the print command is again inputted, the heat roller is started to be heated (point I).

Figure 29:
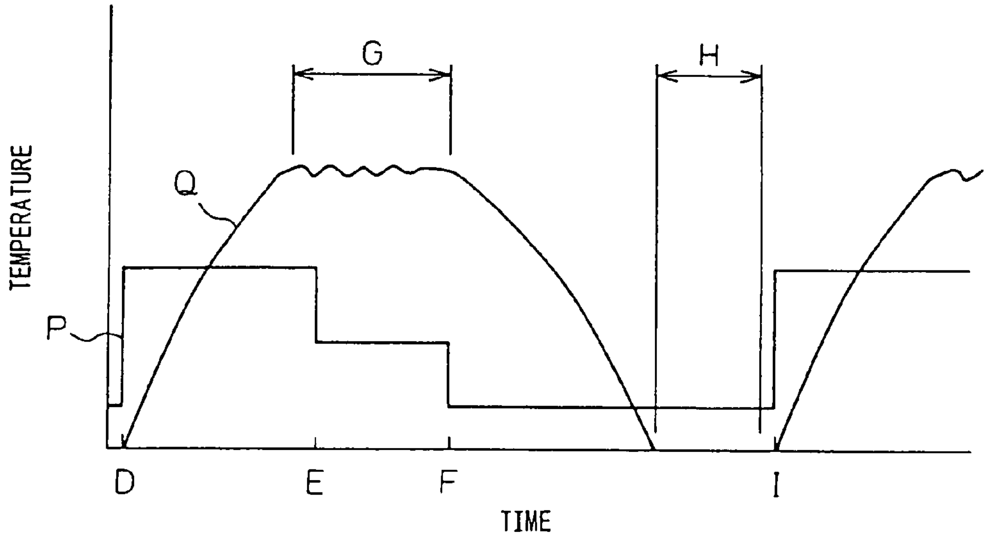
FIG. 29 is a view showing an example of a change in power consumption of a fixing device including a heat roller having a halogen lamp and a temperature change of the heat roller.

FIG. 29 is a view showing an example of a change of power consumption of the fixing device 10 using a halogen lamp and the surface temperature change of the heat roller 12. A curve P represents the power consumption and a curve Q represents the temperature of the heat roller 12 having the halogen lamp. When a print command is inputted, maximum electric power for rising the temperature of the heat roller up to the fixing temperature is supplied (point D), the supplied electric power is controlled at the time when the temperature of the heat roller reaches the fixing temperature (point E), and then, the supplied electric power is kept with a small value after the completion of the printing (point F). Symbol G represents a printing period, and symbol H represents a waiting time. When the print command is again inputted, the heat roller is started to be heated (point I).

The heat roller having the halogen lamp is low in thermal efficiency compared to the directly-heated heat roller 12, so that preheating is required after the completion of the printing in order to satisfy the temperature-rising performance. Control for reducing the power consumption is possible in the directly-heated heat roller 12 by taking advantage of excellent temperature-rising time.

The features of the above mentioned plural embodiments can suitably be combined to be executed.

As explained above, the present invention can provide a heat roller including a sheet-like heating element and excellent in thermal efficiency. A heat roller according to the present invention is always stable even in a high-speed rotation, and further, can supply heat with reduced non-uniform temperature. The speed for increasing the temperature becomes fast, and a degree of freedom in designing the external electrode is enhanced. It has a fuse function prepared for extraordinary heating, whereby the power source input can immediately be cut when the abnormality occurs. The temperature measurement is possible by the temperature sensor incorporated in the sheet-like heating element without newly arranging a component for measuring the temperature. The temperature distribution in the heating area becomes uniform, thereby being capable of holding down the non-uniform temperature to the minimum.

The invention claimed is:

1. A heat roller comprising:

a sheet-like heating element having a resistance member embedded between two insulating members;

an inner tube that comes in intimate contact with an inner surface of the sheet-like heating element, said inner tube being constructed of a metallic material;

an outer tube that comes in intimate contact with an outer surface of the sheet-like heating element, said outer tube being constructed of a metallic material; and a fuse formed by reducing a width of a line of a pattern of the resistance member, a thickness of an insulating member contacting the outer tube being thinner than an insulating member contacting the inner tube.

2. A fixing unit having the heat roller according to claim 1.

3. An image forming apparatus having the heat roller according to claim 1.

4. The heat roller according to claim 1, wherein the resistance member is formed such that a heating density of the sheet-like heating element is changed in an axial direction of the heat roller.

5. The heat roller according to claim 4, wherein the heating density at an edge section of the sheet-like heating element is greater than that at a center with respect to the axial direction of the heat roller.

6. The heat roller according to claim 1, further comprising a temperature sensor.

7. The heat roller according to claim 6, wherein the temperature sensor is disposed in the same layer as the pattern of the resistance member.

8. A heat roller comprising:

a sheet-like heating element having a resistance member embedded between two insulating members;

an inner tube that comes in intimate contact with an inner surface of the sheet-like heating element;

an outer tube that comes in intimate contact with an outer surface of the sheet-like heating element; and a fuse formed by reducing a width of a line of a pattern of the resistance member, the outer tube being made of Al—Mg—Si having a strength greater than that of the inner tube made of Al.

9. A fixing unit having the heat roller according to claim 8.

10. An image forming apparatus having the heat roller according to claim 8.

11. The heat roller according to claim 8, wherein the resistance member is formed such that a heating density of the sheet-like heating element is changed in an axial direction of the heat roller.

12. The heat roller according to claim 11, wherein the heating density at an edge section of the sheet-like heating element is greater than that at a center with respect to the axial direction of the heat roller.

13. The heat roller according to claim 8, further comprising a temperature sensor.

14. The heat roller according to claim 13, wherein the temperature sensor is disposed in the same layer as the pattern of the resistance member.

15. A heat roller comprising:

a sheet-like heating element having a resistance member embedded between two insulating members;

an inner tube that comes in intimate contact with an inner surface of the sheet-like heating element;

an outer tube that comes in intimate contact with an outer surface of the sheet-like heating element; and a fuse formed by reducing a width of a line of a pattern of the resistance member, a thermal capacity of the outer tube being greater than a thermal capacity of the inner tube.

16. A fixing unit having the heat roller according to claim 15.

17. An image forming apparatus having the heat roller according to claim 15.

18. The heat roller according to claim 15, wherein the resistance member is formed such that a heating density of the sheet-like heating element is changed in an axial direction of the heat roller.

19. The heat roller according to claim 18, wherein the heating density at an edge section of the sheet-like heating element is greater than that at a center with respect to the axial direction of the heat roller.

20. The heat roller according to claim 15, further comprising a temperature sensor.

21. The heat roller according to claim 20, wherein the temperature sensor is disposed in the same layer as the pattern of the resistance member.

* * * * *